United States Patent [19]

Sauerwein

[11] 4,232,965
[45] Nov. 11, 1980

[54] OPTICAL SIGHTING DEVICE

[75] Inventor: Georges Sauerwein, Feucherolles, France

[73] Assignee: AB Broderna Kjellstrom, Stockholm, Sweden

[21] Appl. No.: 936,802

[22] Filed: Aug. 25, 1978

[30] Foreign Application Priority Data

Sep. 2, 1977 [FR] France ............................... 77 26757

[51] Int. Cl.³ .............................................. G01C 1/00
[52] U.S. Cl. ...................................... 356/144; 33/276; 350/145
[58] Field of Search ................... 356/7, 144; 33/276, 33/277, 279, 280; 350/174, 288, 301, 21, 145

[56] References Cited

U.S. PATENT DOCUMENTS

| 2,796,805 | 6/1957 | Morgan | 350/174 |
| 3,801,187 | 4/1974 | McMichael | 350/301 |
| 3,973,835 | 8/1976 | Miyakawa et al. | 350/174 |

Primary Examiner—John K. Corbin
Assistant Examiner—R. A. Rosenberger
Attorney, Agent, or Firm—Brisebois & Kruger

[57] ABSTRACT

A handheld optical sighting device having a sighting means for direct forward observation and reflective surfaces that enable images of two objects, one directly ahead of and one directly to the rear of an observer to coincide when the device is aligned with and between the two objects. The device includes two reflective surfaces for reflecting light rays from the rear object by 180 degrees.

7 Claims, 4 Drawing Figures

OPTICAL SIGHTING DEVICE

This invention relates to an optical sighting device which can be used in particular for sea navigation so as to facilitate the keeping of a vessel on its correct course.

The sighting devices in common used by navigators to taking bearings of an object or of a point whose position is defined on the chart, are usually formed of a magnetic compass and properly so called optical sighting system, contingently fitted with an eyepiece which enables, in the observers's eye, a perceptible coincidence of the direct image of the point on which bearings are taken with a reflected image of the mobile dial fitted to the compass. This kind of disposition therefore enables the ship to be positioned on the chart by taking bearings on various cardinal points situated in different directions. In coastal navigation or during landings, it is moreover frequent to make use of courses shown on nautical charts and materialized by the alignment of two conspicuous points or lankmarks. The use of these leading marks, which is of particular interest to enter or navigate within a relatively narrow channel, offers the advantage of great accuracy, the course being perfectly defined so long as the vessel stays on the alignment of these leading marks with any lurching on the bed being immediately perceptible.

To pinpoint such a leading mark one can use the sighting devices adapted to determining a bearing. It is also possible to follow a lead mark without the help of any particular appliance.

It will however be understood that this method of navigation can only be applied in the event that the two conspicuous points which materialize the alignment are to be found on the same side of the boat and preferably towards its bows. When the two leading marks are astern of the vessel, we can in effect understand that to stay on course on such an alignment presents difficulties, particularly in cases where navigation is taking place in a narrow channel with successive bends or littered with various obstacles, necessitating unceasing attention forward of the ship.

When the alignment is materialized by two relatively distant points, with one ahead of the vessel and the other astern, it is in practise very difficult to keep the ship on an accurate course.

The aim of the present invention is to enable an alignment to be followed which is formed of two conspicuous points situated behind the boat without having to turn round, so that constant watch can be kept forwards.

The present invention has also the aim of allowing an alignment to be used which consists of two land-marks between which the ship is located.

According to the present invention, the optical sighting device, comprises means for sighting an object in front in one direction and means for sighting a rear object in an opposite direction, and also means for making the images of the two objects to coincide. This can be obtained by a 180° deflection of the light rays coming from the rear.

In the most favoured method of operation, the inventino device comprises two reflective surfaces which can be done in the form of mirrors or in the form of optical prisms, capable of diverting light rays coming form the object at the rear in such a way as to guide them onto a sighting port form front to rear. To achieve said deflection of 180°, said two reflective surfaces must be perpendicular to each other. To improve sighting, the said port can with advantage be made of a sighting eyepiece.

In an advantageous method of using the invention device, one of the reflective surfaces is made in the form of a semi-reflective surface in such a way as to let direct luminous rays coming from the object ahead pass through the sighting port or eye-piece.

In is practical form, the invention's sighting device includes a housing enclosing the reflective surfaces and the sighting port. In an alternative version the housing has on at least one of its lateral walls a pair of guide marks, defining a linen of sight parallel to the axis of the sighting port or eye-piece. If in addition it is desired to use the invention device to choose one or the other side, it is preferable to make provision on the opposite lateral wall of the housing for a second pair of guide marks also defining a line of sight parallel to the axis of the sighting port or eye-piece in such as to allow of the use of the invention sighting device after this has been turned round the axis of the sighting port or eye-piece. In this method of execution, the sight in the direction of the forward object is therefore done directly above the housing of the invention device.

In another method of execution the direct sighting is done by means of an additional eye-piece situated at a certain distance from the indirect sighting eye-piece, matching the average spacing of the observer's eyes.

In all methods of execution the horizontal field of sight towards the rear must be as wide as possible to facilitate search of the rearward object.

The dimensions of the reflective surface on which is monitored the second reflection of luminous rays from the rear can be smaller than those of the other reflective surface. These dimensions will be easily determined in function of effective length in practical use of the optical path inside the device, this length itself depending on the housing dimensions.

In a favoured method of execution the device comprises at least one port made in the reflective surface in which is received the second reflection of luminous rays coming from the rear, the said port allowing of direct passage of luminous rays from the front. If in addition it is desired to make one of the invention device on one or the other side it is preferable to make provision for two ports placed respectively above and below the reflective part of the said surface.

The present invention will be better understood with study of several methods of execution described in a fashion which is in no way restrictive and illustrated by drawings on which:

Figure 1:
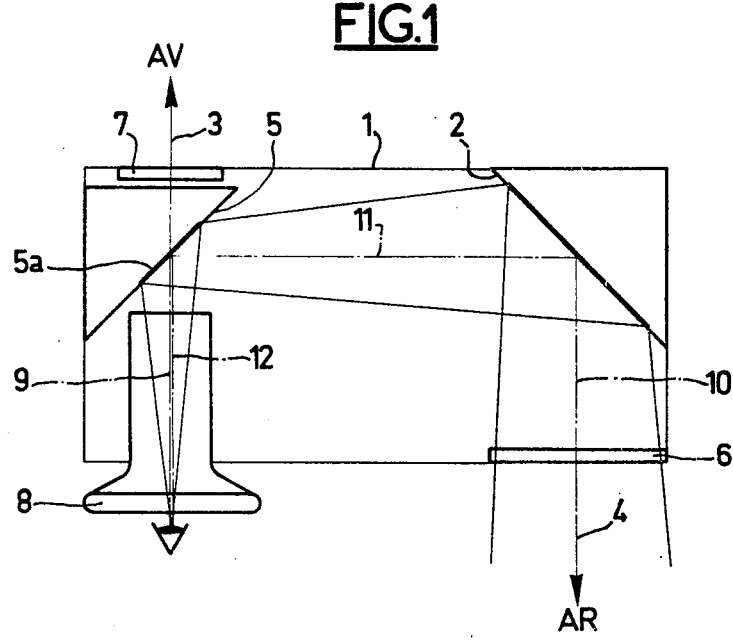
FIG. 1 is a very skeleton plan view of a first method of execution of an optical sighting device following the invention showing in section the internal comonents of the housing.

In the method of execution very sketchily outline in FIG. 1, the optical sighting device as per the invention includes a housing 1 in which is arranged a first reflective surface 2 at an angle of 45° to the general direction of observation between an object situated in front of the device in the direction of arrow 3 and an object situated at the rear of the device in the direction of arrow 4. The reflective surface 2 which can take the form of a mirror or an optical prism, is arranged in the forward angle of housing 1. Opposite this first reflective surface and in the opposite forward corner of housing 1 there is fitted a semi-reflective surface 5 which is also inclined at 45° but perpendicular to reflective surface 2.

The converging beams of luminous rays coming from the rear are reflected at first on surface 2. In view of this convergency the second reflection on surface 5 covers only a small part of the said surface 5a of 5. In an alternative solution not depicted on the FIG. it would therefore be possible to limit reflective surface 5 to this part 5a and to take advantage of this space gained to set out two ports above and below the part 5a so as to allow of direct sighting forwards.

The rear lateral wall of housing 1 comprises, close to the rear corner opposite to the corner carrying the reflective surface 2, a transparent port 6 which can to advantage be fitted with a cross-wire and allowing of penetration of luminous rays coming from an object situated towards the rear in the direction of arrow 4.

On the opposite lateral wall of housing 1, and close to the corner where the semi-reflective surface 5 is mounted, there is a transparent port 7 which can also be fitted with a cross-wire and allowing of the penetration by luminous rays coming directly from a point situated towards the front of the device in the direction of arrow 3.

Opposite the direct sighting port 7, and on the same frontal as the indirect sighting port 6, there is a sighting eye-piece 8 fitted which optical axis corresponds to the axis of port 7.

The luminous rays coming directly from an object situated forwards in the direction of arrow 3 enter through the transparent port 7, pass through the semi-reflective surface 5 and follow the axis of sighting eye-piece 8, according to the direct optical path 9. The luminous rays coming from the object at the rear located in the direction of arrow 4 penetrate for their part by the transparent port 6 and are deflected firstly through 90° by reflective surface 2 following optical path 10, 11. The rays thus deflected a first time parallel to the lateral walls taking ports 6 and 7 of the housing are deflected a second time, again throught 90° by semi-reflective surface 5 and enter in an indirect way in sighting eye-piece 8 following its optical axis by optical path 12.

The semi-reflective surfaces 2 and 5 and also the eye-piece 8 are arranged inside the housing 1 in such a way that optical paths 9 and 12 are merged to a great extent in the axis of sighting eye-piece 8.

The user making observations through eye-piece 8 can then, without any difficulty, cause the forward object located in the direction of arrow 3 to coincide constantly with the rear object located in the direction of arrow 4. He can therefore easily keep his vessel on the leading mark materialized by the land-marks formed respectively by the forward object located in the direction of arrow 3 and the rear object located in the direction of arrow 4. He can also follow his course in the direction decided by arrow 3 whilst at the same time constantly keeping watch on an alignment materialized by two land-marks located towards the rear of the apparatus in the direction of arrow 4.

To make sighting easier it will be understood that the distance between the optical centers of the two surfaces 2 and 5 can be selected in such a way as to clear properly the transparent port 6 allowing of indirect sighting to the rear while the apparatus is in use.

To slight displacement resulting from this between arrows 3 and 4 is in practice completely negligible so that one can perfectly well consider that forward and rearward objects are aligned with the center of housing 1.

The invention device can be used equally well to the right or left, the user placing either his right eye or his left eye opposite the eye-piece 8 whilst turning the device round the axis of eye-piece 8.

Although the device has been described as being comprised of an optical system in the shape of a sighting eye-piece, it will be understood that it will also be possible to simplify the apparatus by replacing the eye-piece by a simple transparent surface.

Figure 2:
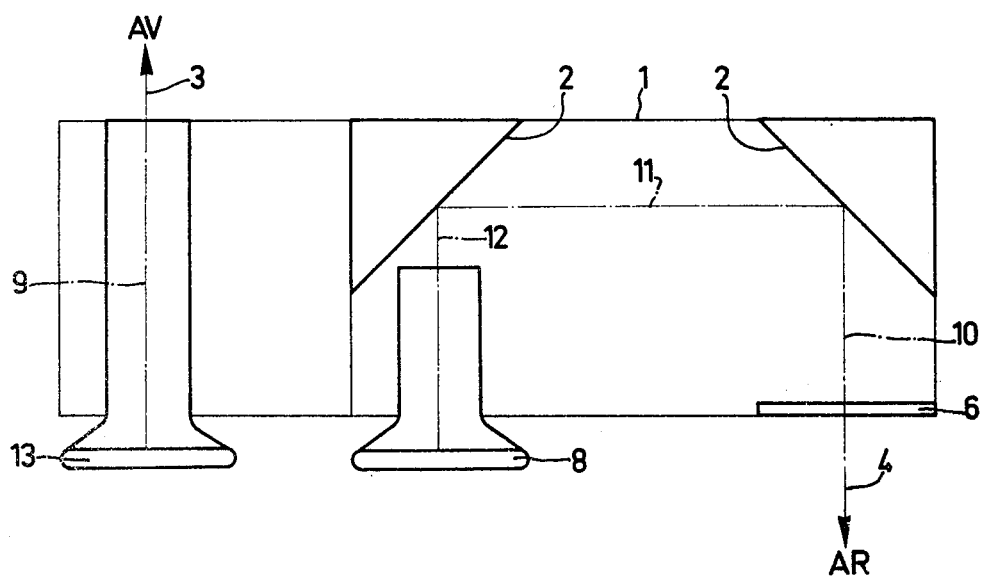
FIG. 2 is a similar view of a second method of execution of a device conforming to the invention.

The method of execution shown on FIG. 2, with identical parts having the same references, includes an additional direct sighting eye-piece 13 which is placed at a suitable distance from the indirect sighting eye-piece 8 corresponding to the average distance between an observer's eyes. With this type of execution it is no longer necessary to use a semi-reflective surface to reflect the luminous rays coming from the rear object. The portion of housing 1 corresponding to indirect vision coming from the rear object has therefore two identical reflective surfaces 2 set at 90° one in relation to the other on two opposite corners of the housing as in the previous method of execution, in such a way as to reflect the luminous rays coming from arrow 4 from front to rear in the axis of indirect sighting eye-piece 8.

Such a binocular layout makes use of the synthesis of images formed by the observer's two eyes to make the luminous rays coming directly from the forward object coincide with the light rays coming indirectly from reflection of the rear object.

Figure 3:
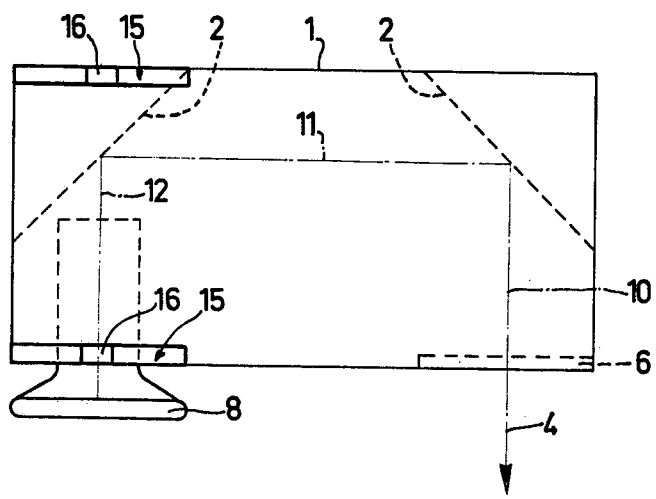
FIG. 3 is a view in external section of a third method of execution of a device conforming to the invention.
Figure 4:
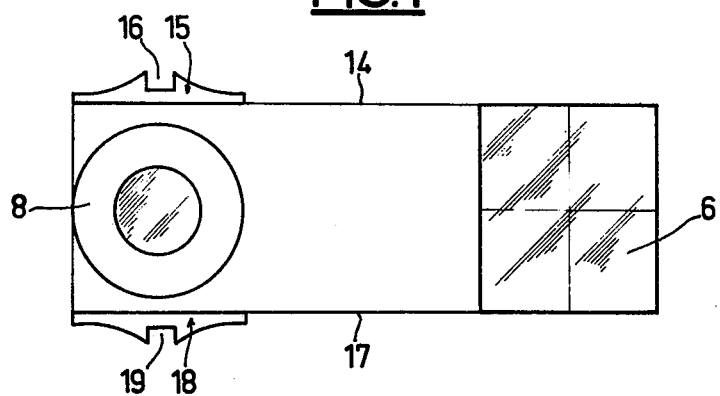
FIG. 4 is a vertical section view of the layout of FIG. 3.

The method of execution shown on FIGS. 3 and 4, on which identical parts have the same references, depicts, like the method of execution of FIG. 2, two identical reflective surfaces 2 arranged at 90° one from the other. Sighting eye-piece 8 serves only for indirect vision of light rays coming from the rear object in the direction of arrow 4.

In this method of execution, the housing 1 has, on its upper lateral wall 14 and close to the extreme edges which demarcate it from the side of housing 1 where the sighting eye-piece 8 is mounted, two upper guide marks 15 formed by excresences fitted with a sighting groove 16 whose alignment defines a line of sight parallel to the axis of sighting eye-piece 8.

Similary, the lower opposite lateral wall 17 of housing 1 shows two guide marks 18 which are identical to guide marks 15 and also including a groove 19, the alignment of these two grooves providing anther line of sight also parallel to the axis of sighting eye-piece 8. When the invention device has a housing made of moulded plastic material it is an advantage to make these guide marks directly during moulding.

Thanks to the existence of these guide marks defining such a line of sight, it is possible to sight the forward object directly by the said line of sight, outside the housing, whilst the sighting eye-piece 8 simultaneously provides an image of the rear object located in the direction of arrow 4.

The presence of guide-marks on the two opposite lateral walls of housing 1, enables the device to be used in one or another direction after is turned around the axis of eye-piece 8.

Dimensions for the housing of the invention device will be selected in an appropriate fashion, the length of the housing in particular being sufficient to prevent the sighting towards the rear being interfered with by any part of the observer's head or his clothes.

The present invention is not restricted to the above cases. For instance, the two reflective surface, shown to meet the right axis at 45 may meet this axis under different angles provided they remain perpendicular to each other.

The present invention allows of, without any regulation or adjustment, to make use of the land-marks located behind the vessel, to ascertain at any time if the ship is indeed on course and this without having need to turn round. The invention also allows one to keep on an alignment formed by the line joining a land-mark located forward to a land-mark located aft, even when it is very distant from the first one, by instantly appreciating any deviation of the ship from alignment in question.

Although the invention has been described with reference to an advantageous use in sea navigation, it will be understood that the optical sighting layout of the invention can be applied to other purposes, and in particular on any occasion when it will ne necessary to carry out sighting directed simultaneously forwards and backwards.

I claim:

1. A handheld optical sighting device which permits simultaneous observation of two objects, one directly forward of an observer and the other directly to the rear of the observer along parallel paths comprising, sighting means and reflective surfaces enabling images of the two objects to substantially coincide when the sighting device is in alignment with and between the two objects located forward of and to the rear of the sighting device, respectively, wherein the sighting means for the forward object comprises means for directly receiving the light rays coming from said forward object so that these rays impinge an the observer's eye without being reflected, whilst light rays coming from the rear object are subjected to a 180° reflection resulting from two successive reflections of 90°, caused by said reflective surfaces before entering into the said sighting means.

2. Device according to claim 1 comprising a housing enclosing said reflective surfaces, and wherein the sighting device is a sighting eye-piece which receives only indirect light rays coming from the rear object, said housing having on one of its walls a pair of guide marks defining a line of sight parallel to the axis of the sighting eye-piece.

3. Device according to claim 2, wherein said housing carries on an opposite lateral wall a second pair of guide marks which define a line of sight parallel to the axis of said sighting eye-piece, enabling the device to be used with either eye of the user by turning the device about the axis of the sighting eye-piece.

4. Device according to claim 1, wherein said reflective surfaces comprise a first reflective surface reflecting light rays coming directly from the rear object, and a second reflective surface of smaller dimension than the first reflective surface and reflecting rearwardly, light received from said first reflective surface.

5. Device according to claim 4, characterized by at least one port in the second reflective surface for direct passage of light rays from said forward object.

6. Device according to claim 5, characterized by reticulated ports for passage of light rays inside the device.

7. Device according to claim 1, wherein the sighting means includes a first eye-piece for direct sighting and a second indirect sighting eye-piece at a distance which corresponds to the average spacing of an observer's eye.

* * * * *